W. S. GORTON.
ELECTRICAL MEASURING INSTRUMENT.
APPLICATION FILED MAY 4, 1915.

1,186,767.

Patented June 13, 1916.

WITNESSES:
P. J. Fitzgerald
J H Procter

INVENTOR
William S. Gorton.
BY
Wesley G. Carr
ATTORNEY

UNITED STATES PATENT OFFICE.

WILLIAM S. GORTON, OF BALTIMORE, MARYLAND, ASSIGNOR TO WESTINGHOUSE ELECTRIC & MANUFACTURING COMPANY, A CORPORATION OF PENNSYLVANIA.

ELECTRICAL MEASURING INSTRUMENT.

1,186,767.  Specification of Letters Patent.  Patented June 13, 1916.

Application filed May 4, 1915. Serial No. 25,713.

*To all whom it may concern:*

Be it known that I, WILLIAM S. GORTON, a citizen of the United States, and a resident of the city of Baltimore, in the State of Maryland, have invented a new and useful Improvement in Electrical Measuring Instruments, of which the following is a specification.

My invention relates to electrical measuring instruments and particularly to means for measuring voltages.

The object of my invention is to provide a means for measuring the maximum value of a voltage wave irrespective of the frequency, shape and harmonic characteristics thereof.

United States application, Serial No. 798,529, filed by Charles Le G. Fortescue, October 31, 1913, and assigned to the Westinghouse Electric & Manufacturing Company sets forth a method of determining the maximum value of a voltage wave which consists in impressing the voltage wave to be measured across a condenser and determining the charging current of the condenser which is known to be proportional to the maximum value of the voltage wave. In order to rectify the current traversing the condenser, a mechanical rectifier had to, of necessity, be operated in synchronism with the voltage wave to be measured; it will be readily seen that, for relatively high-frequency work, it is impractical to employ apparatus having parts that rotate. Since the rectifier employed in the copending application, Serial No. 798,529 only measured voltage during half the cycle of the voltage wave, it will be understood that, for waves having even harmonic characteristics, it did not operate accurately.

I provide a device that may be constructed to occupy a relatively small space, that does not require any moving parts and that is accurate, irrespective of the frequency and the harmonic characteristics of the voltage wave. My device has the additional advantage in that no phase adjustment or synchronizing is required before it is placed in operation.

My invention comprises a condenser that is disposed across the circuit the voltage of which is to be measured and two mercury-arc rectifiers for alternately permitting the charging current of the condenser to traverse the same. The charging current that traverses one of the rectifiers is permitted to traverse an electrical measuring instrument to thereby indicate the value of the charging current of the condenser during each alternate half cycle.

Figure 1:
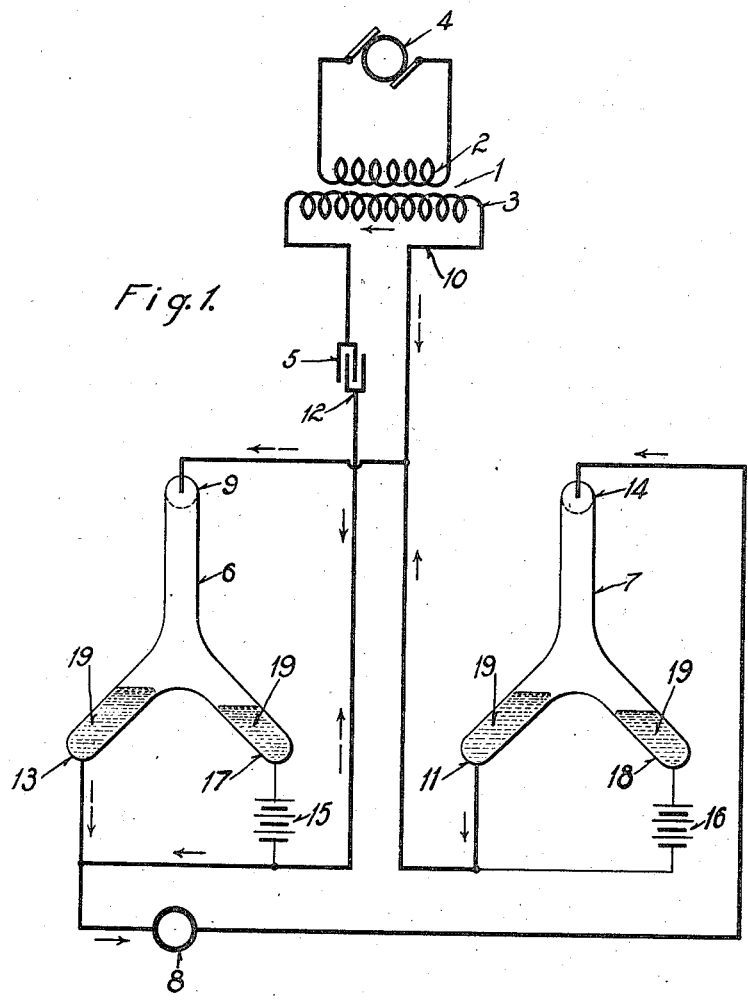
Figure 2:
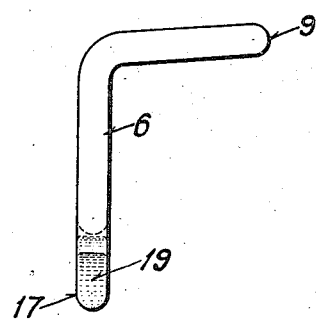

Figure 1 of the accompanying drawings is a diagrammatic view of an electrical circuit in which my invention is embodied, and Fig. 2 is a detail view of a mercury-arc rectifier that is used in the carrying out of my invention.

A transformer 1, having a primary winding 2 and a secondary winding 3, is supplied with energy from a generator 4. In order to determine the value of the voltage impressed across the winding 3, I connect a condenser 5 to one terminal thereof and I operatively connect two mercury-arc rectifiers 6 and 7 thereto for rectifying the current that traverses the condenser 5 and also provide a direct current electrical measuring instrument 8 for measuring the value of the rectified current.

The anode 9 of the rectifier 6 is connected to the terminal 10 of the winding 3 and also to the cathode 11 of the rectifier 7, and the terminal 12 of the condenser 5 is connected to the cathode 13 of the rectifier 6 and to one terminal of the measuring instrument 8, the other terminal of which is connected to the anode 14 of the rectifier 7. Two sources of direct current 15 and 16 are connected, at one terminal thereof, to the auxiliary anodes 17 and 18 of the rectifiers 6 and 7, respectively, and, at the other terminal thereof, to the cathodes 13 and 11, respectively.

The sources of electromotive force 15 and 16 are separate and distinct from each other and are provided for maintaining the arc in the respective rectifiers. This arc cannot be maintained by the current traversing the rectifiers because it is not generally of sufficient magnitude. The anodes 9 and 14 are preferably constructed of relatively fine iron wire that has been well oxidized by passing through the flame of a blast lamp. The object of making the iron electrodes relatively small is to prevent mercury 19 from condensing on the same. This, it will be understood, would interfere seriously with the proper functioning of the devices, as every drop of mercury that would condense and fall would start an arc, irrespective of the direction of voltage drop across the gap. Further, the fine wire will quickly assume the temperature of the surrounding vapor and, consequently, condensation will be reduced. The electrodes are oxidized in order to prevent the amalgamation of the iron and the condensed mercury because the presence of such amalgamated surfaces would facilitate condensation. The cathodes 13 and 11 and the auxiliary anodes 17 and 18 are of the ordinary mercury-pool type.

During one half of the wave, current traverses the winding 3 and condenser 5 in the direction shown by the full-line arrows in Fig. 1 of the drawings, thus traversing the electrical measuring instrument 8 and the rectifier 7 from the anode 14 to the cathode 11 and back to the terminal 10 of the winding 3. The instrument 8 will indicate the average value of the charging current of the condenser 5 through the half cycle. During the next half cycle the current will traverse the winding 3 and the rectifier 6 from the anode 9 to the cathode 13 and condenser 5, substantially as shown by the broken-line arrows. A second electrical measuring instrument may be placed in the circuit of the rectifier 6 but, as it would indicate the same values as the instrument 8, it is not deemed necessary. Since the time taken by the voltage in passing from its maximum value in one direction to its maximum value in the other is $$\frac{1}{2f}$$

and since, in this time, the current goes from zero to the maximum value and back again to zero, the average value of the current is equal to the total charge that is passing through a circuit divided by the time taken for the charge to pass, or, in other words, $$i = 4fVC$$

where $f$ is the frequency of the voltage wave, $V$ is the maximum value of the voltage wave and $C$ is the capacitance of the condenser. Thus, since the instrument 8 indicates the value of $i$ through half the current wave, if the indication of the instrument 8 is doubled, this doubled indication substituted for $i$ in the equation $$i = 4fVC,$$

and the value of the frequency and the capacitance substituted in the equation $$i = 4fVC,$$

an accurate determination of the maximum value of the voltage wave will be obtained.

In order to start my invention in operation, it is merely necessary to slightly tilt the rectifiers 6 and 7 so that an arc may be drawn from the auxiliary anodes 17 and 18 to the cathodes 13 and 11, respectively.

While I have shown an ordinary electrostatic condenser 5 and a specific method of maintaining the arcs, it will be understood that any other type of condenser 5 and any other method of maintaining the arc may be utilized without departing from the spirit and scope of my invention, as set forth in the appended claims.

I claim as my invention;

1. A device for determining the voltage of an electric circuit comprising a condenser connected in the circuit, mercury-arc rectifiers connected in series relation to the condenser and means for measuring the rectified current of the rectifiers.

2. A device for measuring the maximum value of the voltage of a circuit comprising a condenser connected across the circuit, an electro-responsive device and mercury rectifying means for supplying the electro-responsive device with direct-current proportional to the current that traverses the condenser.

3. A voltage-measuring device comprising a condenser that is supplied with current proportional to the voltage to be measured, a measuring instrument and arc rectifying means for supplying the measuring instrument with current proportional to the current that traverses the condenser.

4. A voltage-measuring device comprising a condenser that is supplied with current proportional to the voltage to be measured, a measuring instrument and arc rectifying means for supplying the measuring instrument with rectified current proportional to the current that traverses the condenser.

5. A voltage-measuring device comprising a condenser that is supplied with current proportional to the voltage to be measured, an electro-responsive device and vapor rectifying means for supplying the electro-responsive device with current proportional to the current that traverses the condenser.

6. The combination with an electric circuit, of a condenser connected to the said circuit, a measuring instrument, and vapor-arc rectifying means for supplying the measuring instrument with current during half the cycle of the voltage wave impressed across the circuit.

7. A device for measuring the maximum value of a voltage wave comprising a condenser that is charged with current that is proportional to the voltage to be measured, a measuring instrument and arc rectifying means for supplying the measuring instrument with direct current during half the cycle of the impressed voltage wave.

8. In an electric circuit, the combination with a condenser connected across the circuit, of two arc rectifyers so disposed as to alternately permit the charging current of the condenser to traverse the same, and means connected in series relation with one of the arc rectifiers for measuring the value of the charging current during half the cycle of the voltage wave impressed on the circuit.

In testimony whereof, I have hereunto subscribed my name this twenty-seventh day of April, 1915.

WILLIAM S. GORTON.

Witnesses:
ANNA L. GORTON,
ARTHUR GORTON.